United States Patent Office 3,513,209
Patented May 19, 1970

3,513,209
METHOD OF MAKING 1,4-CYCLOHEXADIENE
Robert Alton Clement, Wilmington, Del., assignor to E. I. du Pont de Nemours and Company, Wilmington, Del., a corporation of Delaware
No Drawing. Filed Aug. 19, 1968, Ser. No. 753,717
Int. Cl. C07c *13/22, 3/60*
U.S. Cl. 260—666          4 Claims

ABSTRACT OF THE DISCLOSURE

Butadiene reacts with acetylene at 80 to 300° C. and preferably at elevated pressures to yield substantial amounts of 1,4-cyclohexadiene. Cyclohexadiene is useful as a polymerizable monomer, as a chemical intermediate, as a hydrogen source for the reduction of organic compounds and as a molecular weight regulator in the preparation of butadiene oligomers.

FIELD OF THE INVENTION

This invention relates to a process for the manufacture of 1,4-cyclohexadiene.

BACKGROUND OF THE INVENTION 1,4-cyclohexadiene is a valuable and versatile chemical intermediate, and numerous methods of making the same have been described. Thus U.S. Pat. No. 2,182,242 issued Dec. 5, 1939 describes the formation of 1,4-cyclohexadiene by the interaction of benzene with alkali or alkaline earth metals in liquid ammonia or amines. U.S. Pat. No. 2,678,338 issued May 11, 1954 describes a process for making 1,4-cyclohexadiene by oxidation of cyclohexane with air followed by an acid-catalyzed reaction of the resulting cyclohexenones and cyclohexenols. U.S. Pat. No. 2,982,792 issued May 2, 1961 describes the preparation of 1,4-cyclohexadiene by the Diels-Alder addition of trans-1,2-dichloroethylene to butadiene followed by dehalogenation of the product. U.S. Pat. No. 3,284,521 issued Nov. 8, 1966 describes a process for the halogenation of cyclohexanes followed by dehydrohalogenation to form a mixture of 1,3- and 1,4-cyclohexadienes.

In view of its utility, there is a real need in the art for an economical synthesis of 1,4-cyclohexadiene.

SUMMARY OF THE INVENTION

The process of the present invention can be defined as contacting and reacting butadiene and acetylene at a temperature in the range between 80 and 300° C. and preferably from 100–250° C. and recovering 1,4-cyclohexadiene from the products of the reaction.

DETAILED DESCRIPTION OF THE INVENTION

The reaction of the present invention can be regarded as a Diels-Alder addition of acetylene to butadiene. The only prior attempt to perform such addition was by H. W. B. Reed, J. Chem. Soc., 1931 (1954) who attampted to prepare 1,4-cyclohexadiene by the Diels-Alder addition of acetylene to 1,3-butadiene in the presence of $[(C_6H_5)_3P]_2Ni(CO)_2$ as a catalyst at 120° C. and established that under such conditions no 1,4-cyclohexadiene was found. Surprisingly, it has been found according to the present invention that high yields of 1,4-cyclohexadiene can be formed by the Diels-Alder reaction in the absence of a catalyst.

Elevated temperatures are necessary for the process of this invention, however, excessive temperatures lead to loss of product by disproportionation and polymerization. Significant yields of the desired 1,4-cyclohexadiene can be obtained at temperatures between 80° C. and 300° C. but it is preferred to react butadiene and acetylene to form 1,4-hexadiene at temperatures between 100 and 250° C.

Pressure promotes the reaction, and the highest pressure compatible with safety and the pressure capabilities of the reaction vessels should be employed. Pressures of 1000 atmospheres or greater can be used in suitable equipment such as continuous flow apparatus employing smallbore pressure tubing. Pressure as low as 1 atmosphere however can be employed, but preferably the pressure should be at least 50 atmospheres.

The ratio of the reactants is not critical, but it is preferred to employ acetylene in excess to reduce the homooligomerization and homopolymerization of butadiene which competes with the reaction of the present invention. Observable quantities of 1,4-cyclohexadiene can be obtained with a molar ratio of acetylene:butadiene of 1:10, but preferably the ratio should be at least 1:1 and higher ratios up to 100:1 or greater compatible with safety requirements are preferable. At high ratios of acetylene:1,3-butadiene, the sole liquid product is 1,4-cyclohexadiene which is thus readily isolated from the gaseous reactants, which can then be recycled.

No solvent is required, but inert solvents such as hydrocarbons, ketones, esters or ethers can be used if desired to provide a diluent for the system when safety so dictates. Low boiling solvents are preferred to simplify the process of isolation.

The reaction can be run as a batch process or in a flow system according to well-known principles of chemical engineering.

1,4-cyclohexadiene is valuable as a chemical intermediate for the manufacture of a wider variety of cyclohexane derivatives by techniques which will be familiar to organic chemists. 1,4-cyclohexadiene is useful as a polymerizable monomer and particularly as a co-monomer with other ethylenic co-monomers to form useful copolymers. When employed as a co-monomer with butadiene, 1,4-cyclohexadiene behaves as a molecular weight regulator. 1,4-cyclohexadiene can be rearranged to give 1,3-cyclohexadiene by processes such as that taught in U.S. Pat. No. 2,316,136. 1,3-cyclohexadiene is also a useful polymerizable monomer and in general gives polymers which are stiffer and higher melting than those made with analogous open chain compounds. 1,4-cyclohexadiene loses hydrogen readily to form benzene and is thus useful as a hydrogen source for the reduction of organic compounds. 1,4-cyclohexadiene is also a useful component of high-energy fuels.

The process of the present invention is further illustrated by the following specific examples which should not, however, be construed as fully delineating the scope of this discovery.

Example 1

A 400-ml. stainless steel tube containing p-xylene (40 ml.) was cooled and evacuated and then charged with 1,3-butadiene (20 g., 0.37 mole) and acetylene (10 g., 0.38 mole). The tube was heated to 180° C. and held at 180° C. for 8 hours, during which time the pressure fell from 575 p.s.i.g. to 385 p.s.i.g. After cooling, the tube was vented and the contents were distilled at room temperature and 1µ pressure to yield a volatile fraction (46.4 g.) and a nonvolatile fraction (2.6 g.). Gas chromatographic analysis (silicone gum nitrile column) revealed the presence of 1,4-cyclohexadiene and benzene in a single unresolved peak, 4-vinylcyclohexene, and 1,5-cyclooctadiene, in addition to solvent and unreacted 1,3-butadiene.

For qualitative analysis, the 1,4-cyclohexadiene-plus-benzene component was condensed from the effluent of the chromatogram and identified by NMR and infrared spectroscopic comparison with authentic materials.

For quantitative analysis, a known amount of cyclohexane was mixed with a known amount of the volatile fraction, and the mixture was subjected to gas chromatography. The cyclohexane and the 1,4-cyclohexadiene-plus-benzene components were condensed from the effluent of the chromatogram into a single trap, the contents of which were diluted with carbon tetrachloride and then examined by NMR spectroscopy. Comparison of appropriate areas of the integrated proton NMR spectrum permitted calculation of yields. The yield of 1,4-cyclohexadiene was 4.0 g. (0.052 mole, 14% conversion of butadiene charged) and of benzene, 0.27 g.

Example 2

The reaction between acetylene and 1,3-butadiene was conducted as in Example 1, except that the tube was heated to 250° C. and held at 250° C. for 8 hours, during which time the pressure decreased from 600 p.s.i.g. to 410 p.s.i.g. The reaction mixture was processed as in Example 1, to yield 48.4 g. of a volatile fraction and 4.8 g. of a non-volatile fraction. Qualitative analysis of the volatile fraction by gas chromatography revealed less 4-vinylcyclohexene than in the volatile fraction in Example 1, and the absence of 1,5-cyclooctadiene and unreacted 1,3-butadiene. Quantitative analysis of the volatile fraction was conducted as in Example 1 and revealed the presence of 1,4-cyclohexadiene in 4.78 g. yield (0.060 mole, 16% conversion of butadiene charged) and benzene in 1.73 g. yield.

Example 3

The reaction was conducted at 180° C. for 8 hours, as in Example 1, except that 26 g. (1.00 mole) of acetylene and 30 g. (0.56 mole) of 1,3-butadiene were employed and the pressure decreased from 1176 p.s.i.g. to 900 p.s.i.g. The reaction mixture was processed as in Example 1 to yield 55.3 g. of a volatile fraction and 4.6 g. of a non-volatile fraction. Qualitative analysis of the volatile fraction by gas chromatography revealed less 4-vinylcyclohexene than in Example 1. Quantitative analysis of the volatile fraction revealed the presence of 1,4-cyclohexadiene in 13.0 g. yield (0.162 mole, 29% conversion of 1,3-butadiene charged) and benzene in 0.42 g. yield.

Example 4

The reaction between acetylene (26 g., 1.00 mole) and 1,3-butadiene (30 g., 0.56 mole) was conducted as in Example 3, except that the tube was heated at 200° C. for 8 hours, and the pressure fell from 1200 p.s.i.g. to 960 p.s.i.g. The reaction was processed as in Example 1 to yield 64.5 g. of a volatile fraction. Qualitative analysis of the volatile fraction by gas chromatography revealed less 4-vinylcyclohexene than in Example 3. Quantitative analysis of the volatile fraction revealed the presence of 1,4-cyclohexadiene in 16.8 g. yield (0.21 mole, 38% conversion of 1,3-butadiene charged) and benzene in 0.74 g. yield.

The volatile fraction remaining from the analytical manipulations described was combined with similar material in Example 3 and distilled through a small Podbielniak column to yield 21.5 g. of 1,4-cyclohexadiene, B.P. 86–88° C., contaminated with ca. 2.5 mole percent benzene (by NMR spectroscopy).

Example 5

The reaction between acetylene (26 g., 1.00 mole) and 1,3-butadiene (30 g., 0.56 mole) was conducted for 8 hours, as in Example 3, except that the temperature was 140° C. and the pressure decreased from 980 p.s.i.g. to 924 p.s.i.g. The reaction mixture was processed as in Example 1 to afford 45.9 g. of a volatile fraction and 0.7 g. of a non-volatile gum. Quantitative analysis of the volatile fraction revealed the presence of 1,4-cyclohexadiene in 4.08 g. yield (0.051 mole, 9.2% conversion of butadiene charged) and only a trace of benzene.

Example 6

The reaction was conducted at 200° C., for 8 hours, as in Example 4, except that 5 g. (0.192 mole) of acetylene and 6 g. (0.111 mole) of 1,3-butadiene were charged and the pressure decreased from 450 p.s.i.g. to 400 p.s.i.g. The reaction mixture was processed as in Example 1 to afford 29.5 g. of a volatile fraction and 0.49 g. of a non-volatile gum. Quantitative analysis of the volatile fraction revealed the presence of 1,4-cyclohexadiene in 2.02 g. yield (0.0252 mole, 23% conversion of 1,3 - butadiene charged) and benzene in 0.05 g. yield.

Example 7

A collapsible platinum capsule was charged with 12 g. of acetylene and 25 g. of butadiene, and heated at 140° C., and 500 atmospheres pressure for 6 hours. The reaction mixture was worked up to obtain 11.4 g. (57% yield) of 1,4-cyclohexadiene, boiling at 90–91° C.; $n_D^{25}$ 1.4704.

*Analysis.*—Calcd. for $C_6H_8$ (percent): C, 90.0; H, 10.0; hydrogenation No. 0.050. Found (percent): C, 90.46, 90.59, 91.12; H, 10.41, 10.31, 10.37; hydrogenation No. 0.0499, 0.0509.

Mass spectroscopic analysis showed a molecular weight of 80 and the spectrum of 1,4-cyclohexadiene.

Hydrogenation over Adams' platinum catalyst gave cyclohexane, boiling at 80–81° C.; $n_D^{25}$ 1.4300.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Process for manufacture of 1,4-cyclohexadiene which comprises contacting and reacting 1,3-butadiene with acetylene at a temperature in the range of 80 to 300° C., and recovering 1:4-cyclohexadiene from the reaction product.

2. Process of claim 1 in which the pressure is at least 50 atmospheres.

3. Process of claim 2 in which the temperature is from 100 to 250° C.

4. Process of claim 3 in which the molar ratio of acetylene:1,3-butadiene is from 1:1 to 100:1.

References Cited

UNITED STATES PATENTS

| | | |
|---|---|---|
| 1,868,127 | 7/1932 | Winkler et al. |
| 2,352,606 | 7/1944 | Alder et al. |
| 3,251,896 | 5/1966 | Novarre. |

OTHER REFERENCES

W. B. Reed, J. Chem. Soc., 1954, pp. 1931–41.

Chem. Abstracts, 64; 11016e, M. F. Shostakovskii et al., U.S.S.R. 176,280 (Cl. C07c) Nov. 2, 1965.

DELBERT E. GANTZ, Primary Examiner

V. O'KEEFE, Assistant Examiner

U.S. Cl. X.R.

260—666